Feb. 25, 1958 D. H. ROSENDAHL 2,824,639
ENDLESS CONVEYOR
Filed March 1, 1955
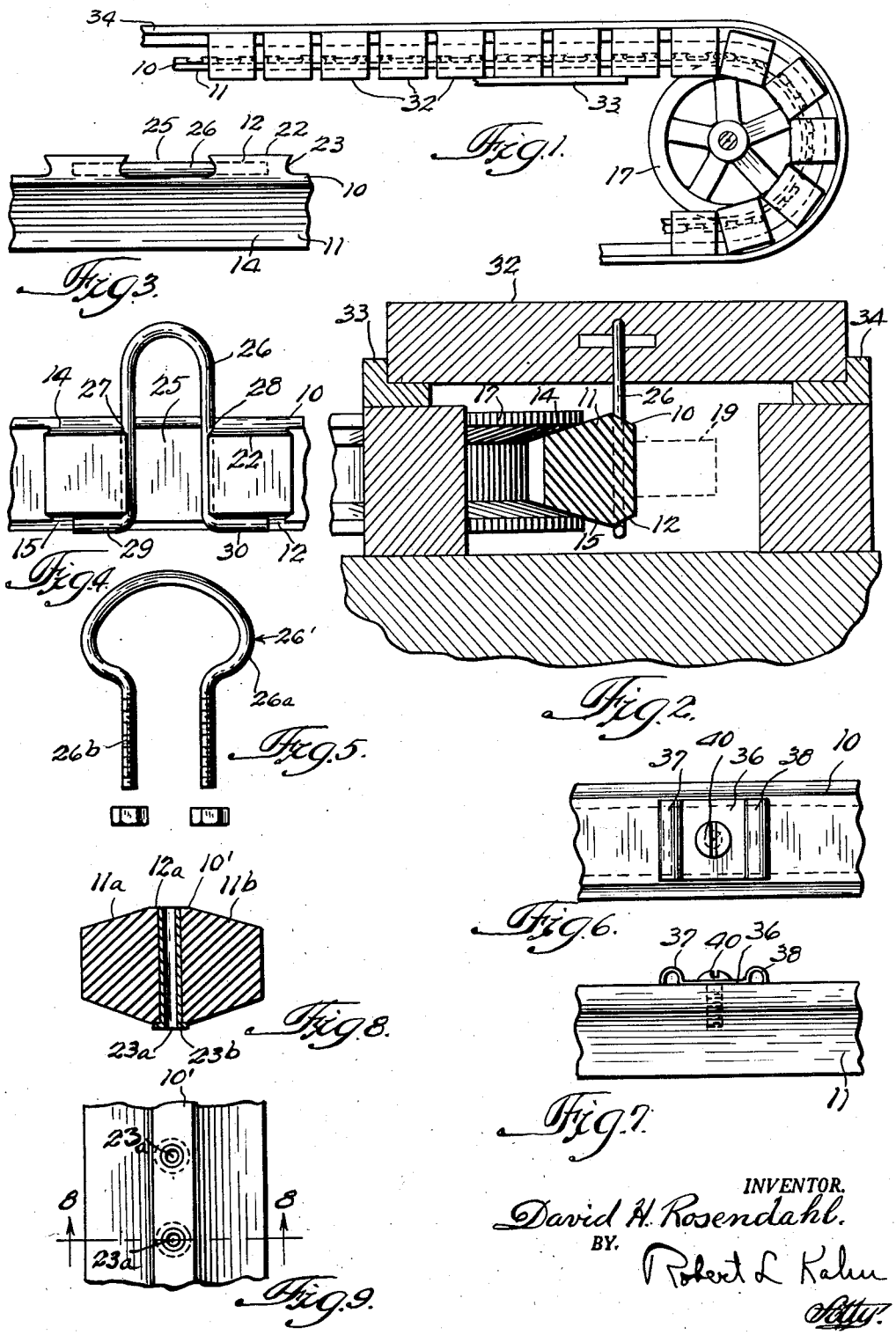
INVENTOR.
David H. Rosendahl.
BY Robert L. Kahn
Atty.

United States Patent Office 2,824,639
Patented Feb. 25, 1958

2,824,639

ENDLESS CONVEYOR

David H. Rosendahl, Mount Prospect, Ill., assignor to Oak Mfg. Co., Chicago, Ill., a corporation of Illinois Application March 1, 1955, Serial No. 491,283

5 Claims. (Cl. 198—189)

This invention relates to a conveyor and more particularly to a conveyor of simple construction adapted for handling comparatively light loads. A conveyor embodying the present invention is characterized by adaptability for various types of use and has the advantage of being simple and economical to manufacture and use.

For a thorough understanding of the invention, reference will now be made to the drawing wherein exemplary embodiments are illustrated, it being understood that variations may be made without departing from the scope of the invention except as defined by the appended claims.

Referring to the drawings, Figure 1 is a plan view of a portion of a conveyor embodying the present invention.

Figure 2 is a transverse enlarged section of the conveyor illustrated in Figure 1.

Figure 3 is a top plan view of a portion of the conveyor belt.

Figure 4 is a side elevation of the conveyor belt portion illustrated in Figure 3.

Figure 5 shows a modified coupling member.

Figure 6 is a detail of a modified form of conveyor.

Figure 7 is a plan view of the modified form of conveyor belt of Figure 6.

Figure 8 is a section on line 8—8 of Figure 9 of a still further modified conveyor belt embodying the present invention.

Figure 9 is a plan view of the conveyor belt portion illustrated in Figure 8.

Conveyor belt generally indicated by 10 may be made of rubber or other flexible material and has pulley-engaging portion 11 and conveyor portion 12. Pulley-engaging portion 11 has the opposite sides 14 and 15 tapered as illustrated in Figure 2 and is adapted to cooperate with the flanges of any one of a number of pulleys 17. The pulleys may be idlers and one of the pulleys in a complete conveyor belt system will be a drive pulley suitably actuated by an electric motor or other source of power. While conveyor belt 10 is preferably so disposed with reference to various pulleys that drive portion 11 of the belt will engage pulleys, it is possible to have conveyor portion 12 bear against one or more idlers 19 in the event that the conveyor belt is to be curved in the reverse direction from that illustrated in Figure 1.

Conveyor portion 12 of the belt in the form illustrated in Figures 1 to 4 inclusive has a plurality of spaced bosses or projections 22 extending the full width of the belt and having undercut sides or shoulders 23 extending transversely of the belt width. Between adjacent bosses 22 are open regions 25. Each free region 25 is bounded by opposed undercut shoulders 23 of bosses 22. It is understood that a complete conveyor belt of desired length will be provided and that the ends thereof will be joined by suitable links as is customary in the belt art.

Each region 25 between adjacent bosses 22 in a conveyor belt is a potentially active belt portion. In order to utilize such an active belt portion, any desired region 25 has wire loop 26, here shown as being generally U-shaped but obviously susceptible to being bent to any desired shape. Loop 26 has straight portions 27 and 28 dimensioned and shaped to fit against undercut shoulders 23 bounding region 25. Preferably, loop 26 is formed of metal or other material and has some elasticity and is adapted to be sprung into position as illustrated in Figure 4 so that straight portions 27 and 28 tend to press away from each other and against the shoulders. Loop 26 has free end portions 29 and 30 extending below the belt shoulders, such portions 29 and 30 being bent away from each other at generally right angles to portions 27 and 28. Loop portions 27 and 28 may be curved, as may shoulders 23, so that portions 27 and 28 will be locked against longitudinal movement.

Loop 26 functions as a driving member for conveyor block 32 riding on tracks 33 and 34. Block 32 may be of metal, wood or plastic or any other desired material and may be provided with a slot or recess into which loop 26 may fit, the arrangement being such that loop 26 will not pull out. Tracks 33 and 34 may be constructed of any suitable material and in sections which may be curved or straight, as desired. Block 32 may slide on tracks 33 or 34 and if necessary, ball bearings in block 32 may be provided for reducing track friction. Block 32 itself supports an article to be conveyed and also supports belt 10.

It is clear that any number of loops 26 together with blocks 32 may be provided and that these loops may be disposed at desired intervals along a length of belt 10.

Referring to Figures 6 and 7, a modification is illustrated wherein conveyor belt 10 consists of drive portion 11 and at spaced intervals has rigidly attached thereto metal clips 36. Each clip 36 is shaped to provide curved end portions 37 and 38. Clips 36 may be attached to the belt by screws 40, the clips being disposed on the large outer face of the belt with curved portions 37 and 38 running transversely of the belt. By spacing clips 36 at suitable intervals along the belt length, loops 26' as illustrated in Figure 5 may be used. This loop has rounded portion 26a bulging laterally of straight portions 26b. The end portions of loop 26' are threaded and have nuts therefor. The units will support belt 10.

Referring now to Figures 8 and 9, belt 10' is illustrated having opposed drive portions 11a and 11b. Portion 12a along the center of the belt may be considered as the conveying portion and is provided with suitable apertures or channels 23a. Metal tubular members 23b generally similar to uncurled long metal eyelets may be provided for lining channels 23a. By having these channels at spaced intervals, loops 26' as illustrated in Figure 5 may be used.

A belt as illustrated in Figures 8 and 9 may be used with pulleys operating on either side of the belt. It is understood, of course, that loop 26' used with this modified belt will propel suitable load-carrying blocks as illustrated above.

In all forms, the conveyor belt will be supported by blocks 32 thus preventing undue sag.

What is claimed is:

1. A conveyor comprising a flexible belt, pulleys and idlers for said belt, a plurality of generally U-shaped driving members of spring material, means on said belt into which said driving members may be sprung for supporting said driving members on said belt with the U being inverted in generally vertical position, a drive track on each side of the track taken by the driving members when the belt moves, support blocks resting on said tracks and means for coupling said driving members to said support blocks so that said blocks support the belt and travel therewith, said blocks carrying work thereon.

2. The construction according to claim 1 wherein said belt has a plurality of spaced bosses and wherein said driving members are shaped so that they may be sprung into position on said bosses.

3. The construction according to claim 2 wherein said blocks have slots into which the coupling members extend.

4. The construction according to claim 1 wherein said belt has attached thereto at spaced intervals metal clips providing spaced fingers and wherein the coupling members consist of wire and are shaped to form an open loop with the arms of the loop engaging said spring fingers and have means cooperating with the bottom of the belt for supporting the belt.

5. The construction according to claim 1 wherein said belt has apertures therethrough into which are threaded spring wire loops, said loops being adapted to engage the support blocks for propelling the same, said loops being threaded for accommodating nuts to support the belt.

References Cited in the file of this patent

UNITED STATES PATENTS

| | | |
|---|---|---|
| 1,505,971 | Rebstock | Aug. 26, 1924 |
| 2,037,815 | Ora | Apr. 21, 1936 |
| 2,383,932 | Brunner | Sept. 4, 1945 |